United States Patent
Dou et al.

(10) Patent No.: US 12,055,106 B2
(45) Date of Patent: Aug. 6, 2024

(54) WORK VEHICLE POWER SYSTEM WITH METHANE AND HYDROGEN FUEL BLEND

(71) Applicant: Deere & Company, Moline, IL (US)

(72) Inventors: Danan Dou, Cedar Falls, IA (US); Scott R. Miles, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/324,491

(22) Filed: May 26, 2023

(65) Prior Publication Data
US 2023/0399988 A1 Dec. 14, 2023

Related U.S. Application Data

(60) Provisional application No. 63/366,362, filed on Jun. 14, 2022.

(51) Int. Cl.
*F02D 19/08* (2006.01)
*F01N 3/20* (2006.01)
*F02D 19/06* (2006.01)

(52) U.S. Cl.
CPC ............. *F02D 19/08* (2013.01); *F01N 3/208* (2013.01); *F02D 19/0644* (2013.01);
(Continued)

(58) Field of Classification Search
CPC ...... F02D 19/08; F02D 19/081; F02D 19/082; F02D 19/0644; F02D 19/0655; F04D 41/0025
See application file for complete search history.

(56) References Cited

U.S. PATENT DOCUMENTS

2002/0134362 A1* 9/2002 Deutsch .............. F02D 19/0615
123/575
2014/0123672 A1* 5/2014 Huntington ............... F02C 3/34
60/39.23
(Continued)

OTHER PUBLICATIONS

Performance Trends, Inc.—Wide Band UEGO A/F(lambda) Sensors, Affordable, Rugged True A/F Sensors and Controller for Accurate Engine Tuning and Troubleshooting on Dyno or In Vehicle, Dec. 2015.
(Continued)

*Primary Examiner* — John Kwon
(74) *Attorney, Agent, or Firm* — KLINTWORTH & ROZENBLAT IP LLP

(57) ABSTRACT

A power system includes an intake arrangement configured to intake charge air; a fuel arrangement configured to store a blend of methane ($CH_4$) and hydrogen ($H_2$) fuel; an engine configured to receive, ignite, and combust a mixture of the charge air and the blend of methane ($CH_4$) and hydrogen ($H_2$) fuel; and a controller coupled to selectively command such that, in a first mode, the controller commands the one or more of the intake arrangement, the fuel arrangement, and the engine such that the charge air and the blend of methane ($CH_4$) and hydrogen ($H_2$) fuel are introduced at a stoichiometric equivalence ratio; and in a second mode, the controller commands the one or more of the intake arrangement, the fuel arrangement, and the engine such that the charge and the blend of methane ($CH_4$) and hydrogen ($H_2$) fuel are introduced at a lean equivalence ratio.

20 Claims, 3 Drawing Sheets

(52) U.S. Cl.
CPC ...... *F02D 19/0647* (2013.01); *F01N 2900/08* (2013.01); *F01N 2900/1404* (2013.01)

(56) References Cited

U.S. PATENT DOCUMENTS

| | | | | |
|---|---|---|---|---|
| 2014/0150445 A1* | 6/2014 | Huntington | ............... | F02C 3/34 |
| | | | | 60/776 |
| 2015/0040574 A1* | 2/2015 | Wichmann | ................ | F01K 5/02 |
| | | | | 60/773 |
| 2015/0308362 A1* | 10/2015 | Dunn | ................. | F02M 21/0278 |
| | | | | 123/480 |
| 2018/0266292 A1* | 9/2018 | Snow | ....................... | F01N 3/106 |

OTHER PUBLICATIONS

Niterra Sensors Products @ https://www.ngkntk.co.jp/english/product/sensors_plugs/, 2023, Niterra Co., Ltd. (3 pages).

* cited by examiner

WORK VEHICLE POWER SYSTEM WITH METHANE AND HYDROGEN FUEL BLEND

CROSS-REFERENCE TO RELATED APPLICATION(S)

This application is a nonprovisional application of, and claims priority to, U.S. Provisional Patent Application 63/366,362, filed Jun. 14, 2022, which is hereby incorporated by reference.

STATEMENT OF FEDERALLY SPONSORED RESEARCH OR DEVELOPMENT

Not applicable.

FIELD OF THE DISCLOSURE

This disclosure generally relates to work vehicles, and more specifically to work vehicle power systems and methods.

BACKGROUND OF THE DISCLOSURE

Heavy work vehicles, such as used in the construction, agriculture, and forestry industries, typically include a power system with an internal combustion engine. Such 17 engines may be spark-ignition engines or compression-ignition engines that use fossil fuels to provide desired efficiency and performance characteristics for associated work operations. However, such fuels may generate undesirable emissions.

SUMMARY OF THE DISCLOSURE

The disclosure provides a work vehicle and power system that operate with a fuel blend of methane ($CH_4$) and hydrogen ($H_2$).

In one aspect, the disclosure provides a power system for a work vehicle. The power system includes an intake arrangement configured to intake charge air; a fuel arrangement including a fuel tank configured to store a blend of methane ($CH_4$) and hydrogen ($H_2$) fuel; an engine including a plurality of piston-cylinder sets configured to receive, ignite, and combust a mixture of the charge air and the blend of methane ($CH_4$) and hydrogen ($H_2$) fuel; and a controller coupled to selectively command one or more of the intake arrangement, the fuel arrangement, and the engine such that, in a first mode, the controller commands the one or more of the intake arrangement, the fuel arrangement, and the engine such that the charge air and the blend of methane ($CH_4$) and hydrogen ($H_2$) fuel are introduced into the engine at a stoichiometric equivalence ratio; and in a second mode, the controller commands the one or more of the intake arrangement, the fuel arrangement, and the engine such that the charge and the blend of methane ($CH_4$) and hydrogen ($H_2$) fuel are introduced into the engine at a lean equivalence ratio.

In the power system, the controller is configured to selectively command the one or more of the intake arrangement, the fuel arrangement, and the engine into the first mode and into the second mode based at least partially on engine load.

In the power system, the controller is configured to selectively command the one or more of the intake arrangement, the fuel arrangement, and the engine into the first mode when the engine load is less than or equal to a load threshold and into the second mode when the engine load exceeds the load threshold.

In the power system, the controller is configured to selectively command the one or more of the intake arrangement, the fuel arrangement, and the engine into the first mode and into the second mode based at least partially on exhaust temperature. The controller is configured to selectively command the one or more of the intake arrangement, the fuel arrangement, and the engine into the first mode when the exhaust temperature is less than or equal to an exhaust temperature threshold and into the second mode when the exhaust temperature exceeds the exhaust temperature threshold In the power system, the controller is configured to selectively command the one or more of the intake arrangement, the fuel arrangement, and the engine into the first mode and into the second mode based at least partially on engine load and exhaust temperature.

In the power system, the controller is configured to selectively command the one or more of the intake arrangement, the fuel arrangement, and the engine into the first mode when the engine load is less than or equal to a load threshold or when the exhaust temperature is less than or equal to an exhaust temperature threshold; and the controller is configured to selectively command the one or more of the intake arrangement, the fuel arrangement, and the engine into the second mode when the engine load exceeds the load threshold and the exhaust temperature exceeds the exhaust temperature threshold.

In the power system, an exhaust arrangement is coupled to the controller and positioned downstream of the engine to receive exhaust; and, in the second mode, the controller is configured to selectively command the exhaust arrangement to inject a reductant into the exhaust. In the second mode, the controller is configured to command the exhaust arrangement to inject a reductant into the exhaust when an exhaust temperature is greater than an exhaust temperature threshold.

In the power system, an exhaust arrangement coupled to the controller and positioned downstream of the engine to receive exhaust. The exhaust arrangement includes a three-way catalyst.

In the power system, an exhaust arrangement coupled to the controller and positioned downstream of the engine to receive exhaust. The exhaust arrangement includes a particulate filter and a selective catalytic reduction (SCR) system.

In the power system, a fuel sensor is coupled to the controller, and the controller is configured to estimate a composition of the blend of methane ($CH_4$) and hydrogen ($H_2$) fuel in the fuel arrangement and to determine the stoichiometric equivalence ratio and the lean equivalence ratio based on the composition.

In a further aspect, a work vehicle a chassis; a drive assembly supported on the chassis; and a power system supported on the chassis and configured to power the drive assembly. The power system includes an intake arrangement configured to intake charge air; a fuel arrangement including a fuel tank configured to store a blend of methane ($CH_4$) and hydrogen ($H_2$) fuel; an engine including a plurality of piston-cylinder sets configured to receive, ignite, and combust a mixture of the charge air and the blend of methane ($CH_4$) and hydrogen ($H_2$) fuel; and a controller coupled to selectively command one or more of the intake arrangement, the fuel arrangement, and the engine such that, in a first mode, the controller commands the one or more of the intake arrangement, the fuel arrangement, and the engine such that the charge air and the blend of methane ($CH_4$) and hydrogen ($H_2$) fuel are introduced into the engine at a stoichiometric equivalence ratio; and in a second mode, the controller commands the one or more of the intake arrangement, the fuel arrangement, and the engine such that the charge and the blend of methane ($CH_4$) and hydrogen ($H_2$) fuel are introduced into the engine at a lean equivalence ratio.

In the work vehicle, the controller is configured to selectively command the one or more of the intake arrangement, the fuel arrangement, and the engine into the first mode and into the second mode based at least partially on engine load, and the controller is configured to selectively command the one or more of the intake arrangement, the fuel arrangement, and the engine into the first mode when the engine load is less than or equal to a load threshold and into the second mode when the engine load exceeds the load threshold.

In the work vehicle, the controller is configured to selectively command the one or more of the intake arrangement, the fuel arrangement, and the engine into the first mode and into the second mode based at least partially on exhaust temperature; and the controller is configured to selectively command the one or more of the intake arrangement, the fuel arrangement, and the engine into the first mode when the exhaust temperature is less than or equal to an exhaust temperature threshold and into the second mode when the exhaust temperature exceeds the exhaust temperature threshold.

In the work vehicle, the controller is configured to selectively command the one or more of the intake arrangement, the fuel arrangement, and the engine into the first mode and into the second mode based at least partially on engine load and exhaust temperature; the controller is configured to selectively command the one or more of the intake arrangement, the fuel arrangement, and the engine into the first mode when the engine load is less than or equal to a load threshold or when the exhaust temperature is less than or equal to an exhaust temperature threshold; and the controller is configured to selectively command the one or more of the intake arrangement, the fuel arrangement, and the engine into the second mode when the engine load exceeds the load threshold and the exhaust temperature exceeds the exhaust temperature threshold.

In the work vehicle, an exhaust arrangement is coupled to the controller and positioned downstream of the engine to receive exhaust; and, in the second mode, the controller is configured to selectively command the exhaust arrangement to inject a reductant into the exhaust when an exhaust temperature is greater than an exhaust temperature threshold.

In a further aspect, a method is provided for operating a power system for a work vehicle with an intake arrangement configured to intake charge air, a fuel arrangement including a fuel tank configured to store a blend of methane ($CH_4$) and hydrogen ($H_2$) fuel, an engine including a plurality of piston-cylinder sets configured to receive, ignite, and combust a mixture of the charge air and the blend of methane ($CH_4$) and hydrogen ($H_2$) fuel, and a controller coupled to selectively command one or more of the intake arrangement, the fuel arrangement, and the engine. The method includes estimating, with a fuel sensor and the controller, a fuel composition of the blend of methane ($CH_4$) and hydrogen ($H_2$) fuel; commanding, in a first mode by the controller, the one or more of the intake arrangement, the fuel arrangement, and the engine such that the charge air and the blend of methane ($CH_4$) and hydrogen ($H_2$) fuel are introduced into the engine at a stoichiometric equivalence ratio; and commanding, in a second mode by the controller, the one or more of the intake arrangement, the fuel arrangement, and the engine such that the charge and the blend of methane ($CH_4$) and hydrogen ($H_2$) fuel are introduced into the engine at a lean equivalence ratio.

In the method, the commanding, in the first mode, includes commanding the one or more of the intake arrangement, the fuel arrangement, and the engine into the first mode and into the second mode based at least partially on engine load, and the commanding, in the second mode, includes commanding the one or more of the intake arrangement, the fuel arrangement, and the engine into the first mode when the engine load is less than or equal to a load threshold and into the second mode when the engine load exceeds the load threshold.

In the method, the commanding, in the first mode, includes commanding the one or more of the intake arrangement, the fuel arrangement, and the engine into the first mode and into the second mode based at least partially on exhaust temperature; and the commanding, in the second mode, includes commanding the one or more of the intake arrangement, the fuel arrangement, and the engine into the first mode when the exhaust temperature is less than or equal to an exhaust temperature threshold and into the second mode when the exhaust temperature exceeds the exhaust temperature threshold.

In the method, the commanding, in the first mode, includes commanding the one or more of the intake arrangement, the fuel arrangement, and the engine into the first mode when an engine load is less than or equal to a load threshold or when an exhaust temperature is less than or equal to an exhaust temperature threshold; and the commanding, in the second mode, includes commanding the one or more of the intake arrangement, the fuel arrangement, and the engine into the second mode when the engine load exceeds the load threshold and the exhaust temperature exceeds the exhaust temperature threshold.

In the method, a further step includes commanding, in the second mode by the controller, an exhaust arrangement to inject a reductant into the exhaust when an exhaust temperature is greater than an exhaust temperature threshold.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
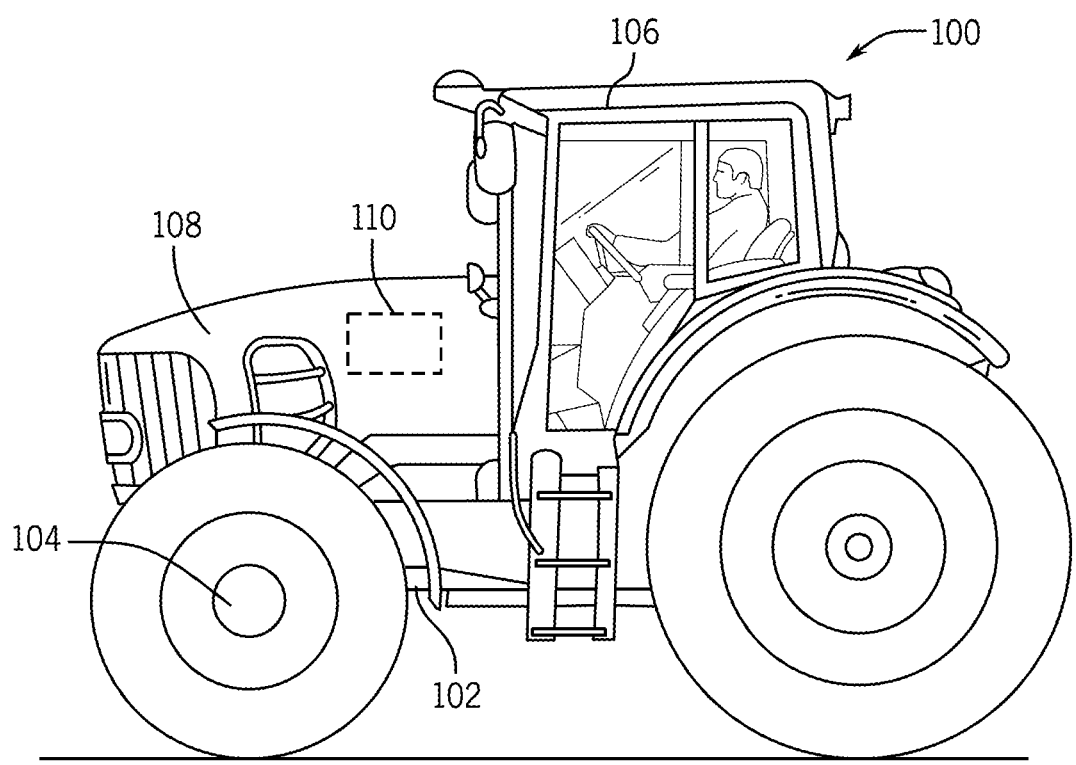
FIG. 1 is a simplified side view of an example work vehicle in the form of a tractor in which a power system may be used in accordance with an embodiment of this disclosure.

The following describes one or more example embodiments of the disclosed power system and method, as shown in the accompanying figures of the drawings described briefly above. Various modifications to the example embodiments may be contemplated by one of skill in the art.

Discussion herein may sometimes focus on the example application of power system in a tractor, but the disclosed power system is applicable to other types of work vehicles and/or other types of engine systems.

Work vehicles may include power systems that typically have diesel engines to produce torque in a wide range of applications, such as long-haul trucks, tractors, agricultural or construction vehicles, surface mining equipment, non-electric locomotives, stationary power generators and the like. Even though such engines may have advantageous energy and performance characteristics, diesel, gasoline, and other types of fossil fuel-based engines may generate undesirable emissions.

In contrast to diesel, gasoline, and other traditional fossil fuels, other, less widely used fuels such as methane ($CH_4$) and hydrogen ($H_2$) may have benefits with respect to both sourcing and emissions. As an example, methane ($CH_4$) or "natural gas" may be considered a renewable fuel produced in biomass from sources such as landfills, animal waste, or other sources. A further renewable fuel is hydrogen ($H_2$) that, at least in some instances, may be transported by existing pipelines.

According to the disclosure provided herein, work vehicle power systems and methods may use a blend of methane ($CH_4$) and hydrogen ($H_2$) as a fuel source. Even though methane ($CH_4$) and hydrogen ($H_2$) are not widely used individually as fuel for vehicles, particularly vehicles for heavy duty applications, methane ($CH_4$) and hydrogen ($H_2$) may have combustion and emissions characteristics that complement one another. As such, it may be beneficial to use a blend of methane ($CH_4$) and hydrogen ($H_2$) as a fuel source, even though the blend level may be subject to variation based on market region, seasonality, and fuel availability.

For example, hydrogen ($H_2$) has a very low ignition requirement, a fast flame speed, high diffusivity for mixing with air, a wide flammability range, and a short-quench distance for less sensitivity to air-fuel ratio. However, hydrogen ($H_2$) may be subject to preignition due to in-cylinder hot spots and may form nitrogen oxides (NOx) due to high adiabatic flame temperatures. Similarly, although methane ($CH_4$) provides advantageous combustion characteristics, methane ($CH_4$) tends to produce unburned fuel emissions due to crevice volumes of the power cylinders, which is an issue due to the impact of methane ($CH_4$) on global warming. As discussed below, combustion and emissions strategies may be employed to address potential drawbacks while capitalizing on the beneficial characteristics of each fuel type.

In a combustion reaction, an amount of air reacts with a corresponding amount of fuel, and the ratio of the amounts in which exactly all oxygen within the air is consumed and all fuel burned is defined as the stoichiometric air/fuel ratio or stoichiometric equivalence ratio (e.g., $\lambda=1$). Operation according to a lean equivalence ratio is defined as having air in excess of the stoichiometric equivalence ratio (e.g., $\lambda>1$), and operation according to a rich equivalence ratio is having air below the stoichiometric equivalence ratio (e.g., $\lambda<1$). Broadly, lean equivalence ratios may result in excess exhaust oxygen, higher thermodynamic efficiencies, hotter lower exhaust temperatures, as compared stoichiometric equivalence ratios; and rich equivalence ratios may result in unburned fuel, lower temperatures, and lower efficiency. The values of the stoichiometric, lean, and rich equivalence ratios may vary based on the particular fuel composition. As an example reference, the stoichiometric equivalence ratio for methane ($CH_4$) is approximately 17:1 and the stoichiometric equivalence ratio of hydrogen ($H_2$) is approximately 34:1.

In the disclosure described herein, the power systems and methods may implement combustion control strategies that modify the air-fuel ratio to address both engine performance and emissions for a blended fuel of methane ($CH_4$) and hydrogen ($H_2$). Moreover, the power systems and methods may have emission control strategies to further address emissions issues for such a fuel blend. In particular, power systems and methods may initially operate the engine in according to a stoichiometric equivalence ratio and subsequently transition to a lean air-fuel ratio at higher loads and temperatures in which emission mitigation strategies are implemented to address any emissions issues resulting from lean operation. Such power systems may provide the desired ignition and combustion characteristics while enabling the use of the renewable fuels that may have more desirable costs and/or reduced emissions, including lower carbon dioxide ($CO_2$), nitrogen oxides (NOx), and other undesirable emissions. Such implementation may apply to new engine designs, existing engine designs, and retrofit kits offered for engines in the field.

In one example, combustion of the blend of methane ($CH_4$) and hydrogen ($H_2$) at a stoichiometric equivalence ratio for relatively light loads enables higher exhaust temperature to provide methane ($CH_4$) oxidation and exhaust treatment warm-up. Transition to lean combustion at higher loads provides benefits to avoid preignition since in-cylinder temperatures will be lower with high dilution as well as lower exhaust temperatures. Moreover, lower surface temperatures of exhaust components provide a safety margin for agriculture applications with exposure to debris. Additionally, lower exhaust gas temperature reduces material requirements for turbochargers relative to maintaining a stoichiometric equivalence ratio at high loads. Furthermore, presence of hydrogen ($H_2$) in the exhaust promotes catalyst activity since hydrogen ($H_2$) is easily oxidized and generates extra heat to assist the methane ($CH_4$) oxidation. As such, hydrogen ($H_2$) not only facilities a more complete methane ($CH_4$) combustion inside the engine but also assists methane ($CH_4$) oxidation in the exhaust stream to effectively reduce the light off temperature of a methane ($CH_4$) oxidation catalyst at both stoichiometric and lean modes of combustion. A three-way catalyst will function as an oxidation catalyst to efficiently oxidize methane ($CH_4$), hydrogen ($H_2$), and carbon monoxide (CO) in the exhaust under lean exhaust compositions. As discussed below, the determination of operating in the stoichiometric equivalence ratio relative to the lean equivalence ratio may depend on power and exhaust temperatures. The relative thresholds may be determined based on the particular blend of methane ($CH_4$) and hydrogen ($H_2$) in the fuel.

Referring to FIG. 1, in some embodiments, the disclosed power systems and methods are implemented with the use of a blended fuel formed by methane ($CH_4$) and hydrogen ($H_2$), as discussed in greater detail below. In the depicted example, such power systems and methods are implemented with a work vehicle 100 embodied as a tractor. In other examples, the disclosed systems and methods may be implemented in other types of vehicles or machines, including stationary power systems and vehicles in the agricultural, forestry, and/or construction industries.

As shown, the work vehicle 100 may be considered to include a main frame or chassis 102, a drive assembly 104, an operator platform or cabin 106, a power system 108, and a controller 110. As is typical, the power system 108 includes an internal combustion engine used for propulsion of the work vehicle 100, as controlled and commanded by the controller 110 and implemented with the drive assembly 104 mounted on the chassis 102 based on commands from an operator in the cabin 106 and/or as automated within the controller 110.

As described below, the power system 108 may include a number of systems and components to facilitate various aspects of operation. The engine of the power system 108 may a spark ignition engine. Moreover, the engine may utilize a blended fuel with two different types of fuel (e.g., methane ($CH_4$) and hydrogen ($H_2$)) provided by a fuel arrangement, as introduced above and discussed in greater detail below. Otherwise, the power system 108 may include an air intake arrangement to provide air that is mixed with fuel and combusted in the engine, as well as additional systems, such as turbocharger and/or exhaust arrangements, as appropriate. Although not shown or described in detail herein, the work vehicle 100 may include any number of additional or alternative systems, subsystems, and elements. Further details of the power system 108 are provided below.

As noted, the work vehicle 100 includes the controller 110 (or multiple controllers) to control one or more aspects of the operation, and in some embodiments, facilitate implementation of the power system 108, including various components and control elements associated with the use of a blended fuel of methane ($CH_4$) and hydrogen ($H_2$), as discussed below. The controller 110 may be considered a vehicle controller and/or a power system controller or sub-controller. In one example, the controller 110 may be implemented with processing architecture such as a processor and memory. For example, the processor may implement the functions described herein based on programs, instructions, and data stored in memory.

As such, the controller 110 may be configured as one or more computing devices with associated processor devices and memory architectures, as a hard-wired computing circuit (or circuits), as a programmable circuit, as a hydraulic, electrical or electro-hydraulic controller, or otherwise. The controller 110 may be configured to execute various computational and control functionality with respect to the work vehicle (or other machinery). In some embodiments, the controller 110 may be configured to receive input signals in various formats (e.g., as hydraulic signals, voltage signals, current signals, and so on), and to output command signals in various formats (e.g., as hydraulic signals, voltage signals, current signals, mechanical movements, and so on). The controller 110 may be in electronic, hydraulic, mechanical, or other communication with various other systems or devices of the work vehicle 100 (or other machinery). For example, the controller 110 may be in electronic or hydraulic communication with various actuators, sensors, and other devices within (or outside of) the work vehicle 100, including any devices described below. In some embodiments, the controller 110 may be configured to receive input commands from, and to interface with, an operator via a human-vehicle operator interface that enables interaction and communication between the operator, the work vehicle 100, and the power system 108.

In some examples, the work vehicle 100 may further include various sensors that function to collect information about the work vehicle 100 and/or surrounding environment. Such information may be provided to the controller 110 for evaluation and/or consideration for operating the power system 108. As examples, the sensors may include operational sensors associated with the vehicle systems and components discussed herein, including engine and transmission sensors; fuel and/or air sensors; temperature, flow, and/or pressure sensors; and battery and power sensors, some of which are discussed below. Such sensor and operator inputs may be used by the controller 110 to determine an operating condition (e.g., a load, demand, or performance requirement), and in response, generate appropriate commands for the various components of the power system 108 discussed below, particularly the fuel, air, and exhaust arrangements for use of the blended methane ($CH_4$) and hydrogen ($H_2$) fuel. Additional information regarding the power system 108 and the fuel control modes is provided below.

Figure 2:
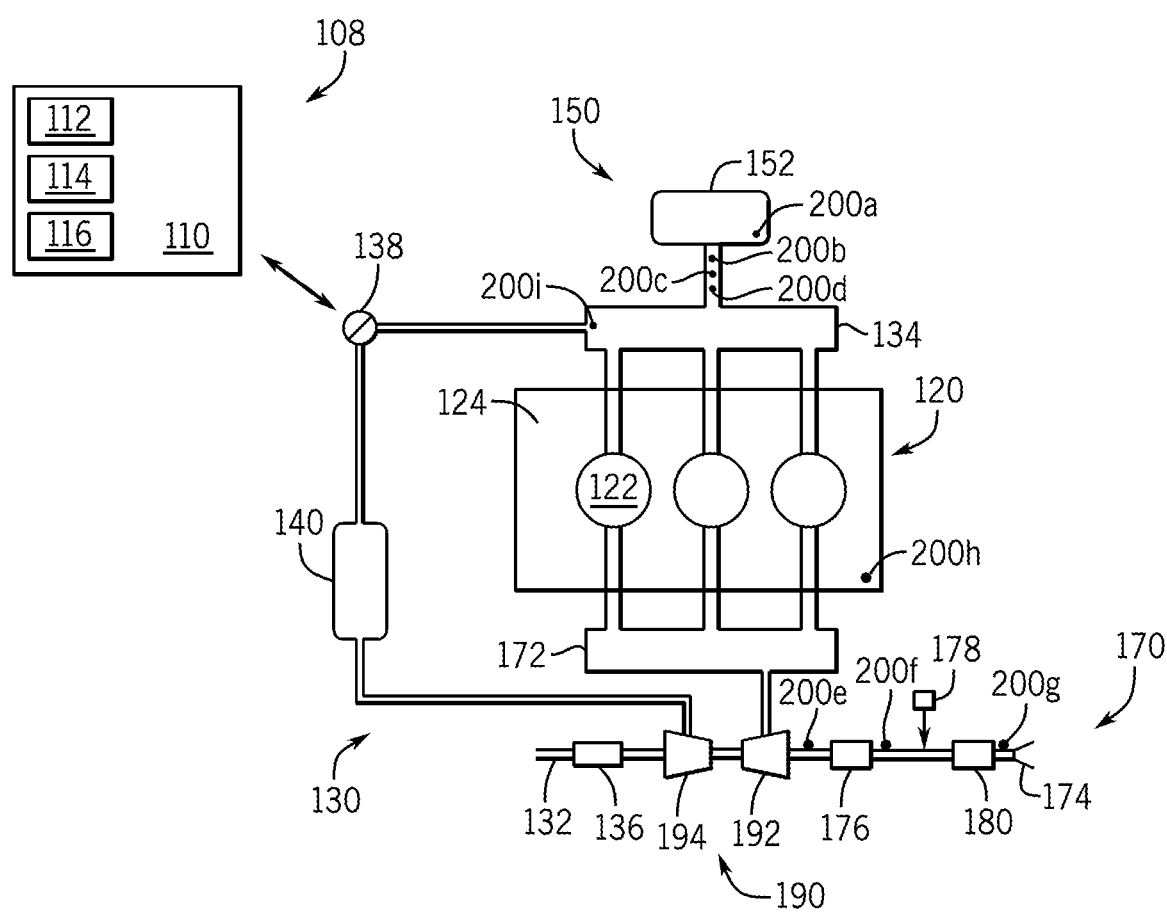
FIG. 2 is a simplified schematic diagram of a power system in accordance with an example embodiment.

Reference is now made to FIG. 2, which is a schematic illustration of the power system 108 for providing power to the work vehicle 100 of FIG. 1, although the characteristics described herein may be applicable to a variety of machines. The configuration of FIG. 2 is just one example of the power system 108 and example embodiments according to the disclosure herein may be provided in other configurations.

As introduced above, the power system 108 may be controlled with a controller 110 that includes a processor 112 that implements instructions stored in memory 114 based on various inputs, including operator commands and/or sensor input regarding the operating condition. Generally, the controller 110 may implement any of the functions described herein. As noted above, the work vehicle 100, power system 108, and/or controller 110 may include or otherwise cooperate with one or more operator interfaces 116 for controlling various aspects of the work vehicle 100, including the power system 108. Such operator interfaces 116 may include a throttle that is configured to command a load on the engine 120 of the power system 108. Additional operator interfaces 116 may include various types of input devices and/or displays.

As also introduced above, the power system 108 includes an engine 120 configured to combust a mixture of air from an air intake arrangement 130 and fuel from a fuel arrangement 150 to generate power for propulsion and various other systems, thereby generating an exhaust gas that is accommodated by an exhaust arrangement 170. As described in greater detail below after a brief description of other aspects of the power system 108, the controller 110 may command the engine 120, the air intake arrangement 130, the fuel arrangement 150, and the exhaust arrangement 170 according to one or more control modes, including a stoichiometric control mode and a lean control mode in which the air-fuel ratios are manipulated to provide desired performance and emissions characteristics.

As also noted above, the engine 120 is selectively providing air for combustion by the air intake arrangement 130. The air intake arrangement 130, in this example, includes an air intake conduit 132 and an intake manifold 134. The air intake arrangement 130 directs fresh or ambient air through the air intake conduit 132 as charge air. In this example, the intake manifold 134 may receive the charge air and additionally receive fuel from the fuel arrangement 150 such that the air and fuel are mixed prior to being directed into the engine 120. In other examples, a separate mixer may be provided and/or the fuel may be injected directly into the engine 120. In one example, the mixture of fuel and air is directed into the piston-cylinder sets 122 of the engine block 124 to be ignited. The resulting combustion products drive the mechanical output of the engine 120.

In one example, the air intake arrangement 130 may include a filter 136 (or other intake air treatment apparatus) arranged on or proximate to the air intake conduit 132 to filter the intake air. Moreover, an air throttle valve 138 may be provided to control the flow of air through the air intake arrangement 130 based on commands from the controller 110, as discussed in greater detail below. In one example, the air intake arrangement 130 may include a charge air cooler 140 to reduce the temperature of the charge air (e.g., particularly the compressed charge air from the turbocharger arrangement 190, discussed below). In this example, the charge air cooler 140 is configured to direct the charge air into proximity with cooling air (or other type of coolant) such that the heat is transferred from the charge air to the cooling air. Other cooling or heat exchange mechanisms may be provided. As noted, the intake air is directed into the engine 120 via the intake manifold 134. As described below, the intake air may be mixed with fuel in the intake manifold 134, while in other examples, the fuel and intake air may be mixed in a separate component and/or within the engine piston-cylinder sets 122.

As introduced above, the fuel arrangement 150 is configured to provide fuel to the engine 120. In particular, the fuel arrangement 150 is configured to deliver a blend of methane ($CH_4$) and hydrogen ($H_2$) as the fuel. Generally, any ratio of methane ($CH_4$) and hydrogen ($H_2$) may form the blended fuel, including ratios of approximately 0% methane ($CH_4$) to approximately 100% hydrogen ($H_2$), approximately 100% methane ($CH_4$) to approximately 0% hydrogen ($H_2$), and any ratios in between. In one example, the blended fuel may be stored in a fuel tank 152. Typically, the blended fuel may be stored in gaseous or liquid form in the fuel tank 152 that is directed by the fuel arrangement 150 from the tank to the intake manifold 134 for mixing with the intake air from the air intake arrangement 130. In one example, the fuel tank 152 stores the blend of fuel under pressure as a liquid such that the fuel is introduced to the engine 120 as a gas. Although not shown, additional components may be provided, including control valves, pumps, and the like.

Generally, the engine 120 may be any type of engine that utilizes the blended of the fuel arrangement 150. In one example, and as discussed in greater detail below, the engine 120 may be a spark ignition engine in configuration and arrangement. The engine 120 may have any number or configuration of piston-cylinder sets 122 within an engine block 124. In the illustrated implementation, the engine 120 is an inline-3 (I-3) engine defining three piston-cylinder sets 122, although other configurations may be provided, including four and six piston-cylinder sets. In addition to those discussed below, the engine 120 may include any suitable features, such as cooling systems, peripheries, drivetrain components, sensors, etc.

In one example, each of the piston-cylinder sets 122 includes a piston arranged within the cylinder to create a combustion chamber in between such that movement of the piston within the cylinder functions to facilitate the flow of gas into and out of the combustion chamber; to compress the gas within the combustion chamber to enable ignition and combustion (e.g., via spark ignition); and to be driven by the combustion products to transfer the resulting mechanical power from the combustion process to a prime mover of the engine 120. Typically, an intake valve is arranged to open and close an intake port to admit intake gas into the combustion chamber; and an exhaust valve is arranged to open and close an exhaust port to enable gas to flow out of the combustion chamber into the exhaust arrangement 170.

The exhaust gas produced from the combustion process of the engine 120 may be received by the exhaust arrangement 170, which includes an exhaust manifold 172 to receive and distribute the exhaust from the piston-cylinder sets 122. At least a portion of the exhaust gas is directed from the exhaust manifold 172 into an exhaust conduit 174 out of the work vehicle 100. As schematically shown, the exhaust gas may flow through one or more exhaust treatment components 176, 178, 180 arranged on or proximate to the exhaust conduit 174. Generally, such exhaust treatment components 176, 178, 180 may function to treat the exhaust gas passing therethrough to reduce undesirable emissions based on commands from the controller 110. In one example, the exhaust treatment component 176 may be a particulate filter and/or a three-way catalyst component; the exhaust treatment component 178 may be a reductant injection component; and the exhaust treatment component 180 may be a selective catalytic reduction (SCR) system, including a vanadium-based system (V-SCR) or a copper-based system (Cu-SCR). In one example, the reductant injection component 178 may inject a reductant (e.g., ammonia or a reductant mixture of urea and ionized water similar to DEF) that is injected into the exhaust to react with the heat and water in the exhaust to form ammonia, and nitrogen oxide (NOx) is subsequently reduced by ammonia within the SCR system 180 to form water ($H_2O$) and nitrogen ($N_2$), which may be released into the atmosphere. In effect, collectively or individually, the exhaust treatment components 176, 178, 180 may be considered a three-way catalyst arrangement to address pollutants, including hydrocarbons and carbon monoxide (CO), and reduce nitrogen oxides (NOx) into relatively harmless components such as water ($H_2O$), nitrogen ($N_2$), and carbon dioxide ($CO_2$). In some examples, a three-way catalyst may be implemented with a particulate filter (e.g., represented by a combination of components 176, 178, 180) in which a three-way catalyst is incorporated with a particulate filter or with a stand-alone three-way catalyst and a stand-alone particulate filter.

As introduced above and discussed further below, the presence of hydrogen ($H_2$) in the blend of fuel and the subsequent exhaust may promote catalyst activity since hydrogen ($H_2$) is relatively simple to oxidize and further generates additional heat to assist in the oxidation of methane ($CH_4$). As such, the hydrogen ($H_2$) facilities a more complete methane ($CH_4$) combustion inside the engine 120 and also assists methane ($CH_4$) oxidation in the exhaust stream to effectively reduce the light off temperature of a methane ($CH_4$) oxidation catalyst at both stoichiometric and lean control modes of combustion discussed below. The three-way catalytic arrangement formed by one or more of the exhaust treatment components 176, 178, 180 operates as an oxidation catalyst and efficiently oxidizes emissions. During stoichiometric combustion at relatively light loads, engine out nitrogen oxides (NOx) may be relatively high along with favorable exhaust temperature in the range of 400-550° C. for effective emission control by exhaust treatment components 176, 178, 180; and as the power system 108 transitions to lean combustion at high loads, exhaust temperature will stay in the range 350-500° C. for effective nitrogen oxides (NOx) reduction by exhaust treatment components 176, 178, 180 (particularly an SCR). Effectiveness of NOx reduction by ammonia within SCR reduces as temperature exceeds 500° C.

Additionally, during the stoichiometric control mode, discussed below, some ammonia will be formed and may be stored in downstream exhaust treatment components 176, 178, 180 (particularly an SCR) and used for reducing nitrogen oxides (NOx) as a further benefit, even though most of the ammonia for reductions in nitrogen oxides (NOx) may be provided by the exhaust treatment components 176, 178, 180 (particularly a reductant injection apparatus). The functions to reduce the need (or consumption) of reductant from other sources and additionally reduces ammonia slip. In some examples, since both methane ($CH_4$) and hydrogen ($H_2$) produce relatively little particulate matter, a particulate filter may not be necessary.

Other arrangements may be provided and one or more of the exhaust treatment components 176, 178, 180 may be omitted. Additional details about operation of the exhaust treatment components 176, 178, 180 are provided below.

The power system 108 may further include a turbocharger arrangement 190, each of which may have at least portions that may also be considered part of (or otherwise cooperate with) the air intake arrangement 130 and/or the exhaust arrangement 170. In some examples, the turbocharger arrangement 190 may be omitted.

The turbocharger arrangement 190 generally functions to increase the amount of air subsequently directed into the engine 120 for improved engine efficiency and power output. In one example, the turbocharger arrangement 190 includes a turbine that receives a portion (e.g., the first portion) of the exhaust gas, as introduced above. The turbocharger arrangement 190 further includes a compressor 194 that is driven by the turbine 192. The compressor 194 functions to compress the ambient or charge air that enters the air intake arrangement 130 via the air intake conduit 132. Generally, the turbine 192 may be a variable-geometry turbocharger turbine, wastegate (WG) turbocharger turbine, fixed geometry turbocharger turbine, electrically controlled or assisted turbocharger turbine, and/or any other suitable type of turbocharger turbine. Although not shown, the turbocharger arrangement 190 may further include a second turbine that receives the portion (e.g., the second portion) of the exhaust gas after the exhaust gas flows through the turbine 192 and a second compressor that is driven by the second turbine to compress the intake air upstream of the compressor 194.

Although not shown, an EGR arrangement may also be provided. The EGR arrangement is generally configured to direct at least a first portion of exhaust gas out of the engine and then back to the air intake arrangement of the engine for combustion.

Generally, any type of sensor may be provided to facilitate operation of the power system 108, including the example sensors 200a-200i schematically depicted in FIG. 2. Such sensors 200a-200i may be configured to provide measured or derived characteristics of the power system 108 to the controller 110 for consideration in operation of the power system 108. One or more of the sensors 200a-200i may be omitted and/or additional sensors may be provided.

The sensors 200a-200d may be considered fuel sensors positioned within or proximate to the fuel arrangement 150. In particular, one or more fuel tank sensors 200a may be provided to determine various characteristics of the blended fuel, including quantity, quality, and/or the like. As an example, the fuel tank sensor 200a may be a sound speed sensor that determines the relative amounts of methane ($CH_4$) and hydrogen ($H_2$) in the fuel, although other types of sensors may be provided for this purpose. The fuel arrangement 150 may further include fuel sensors 200b, 200c, 200d to measure or otherwise derive various additional characteristics of the fuel, including fuel temperature, fuel pressure, and fuel flow. In one example, the fuel is in the form of a gas such that such sensors 200a, 200b, 200c, 200d are gas sensors, although other arrangements and sensor types may be provided.

The sensors 200e, 200f, 200g may be considered exhaust treatment sensors positioned between, within or proximate to the exhaust arrangement 170 in order to determine or otherwise derive various characteristics of the exhaust. In the depicted example, one or more sensors 200e may be positioned downstream of the engine 120, in between the turbine 192 and the exhaust treatment component 176; one or more sensors 200f may be positioned in between the exhaust treatment component 176 and the exhaust treatment component 178; and one or more sensors 200g may be positioned in downstream of the exhaust treatment component 180, proximate to exhaust conduit 174. As examples, the exhaust treatment sensors 200e, 200f, 200g may be carbon dioxide ($CO_2$) sensors, water ($H_2O$) sensors, oxygen ($O_2$) sensors, nitrogen oxides (NOx) sensors and/or temperature sensors. In various examples, the oxygen (O2) sensor (e.g., one or more of sensors 200e, 200f, 200g and/or a sensor at another position) may be a UEGO (universal exhaust gas oxygen) sensor or a HEGO (heated exhaust gas oxygen) sensor.

One or more sensors 200h may be engine sensors, positioned within or proximate to the engine 120 to determine various types of engine characteristics. Additionally, one or more sensors 200i may be air flow sensors 200i, positioned within or proximate to the air intake arrangement 130 to determine various type of intake air characteristics. In some examples, one or more of the sensors 200a-200i may be omitted and/or the function performed by one or more of the remaining sensors. For example, combinations of sensors 200e-200i may individually or collectively operate as fuel quality sensors, particularly sensors that provide information about flow rate and exhaust composition sensors to estimate the blend composition of methane and hydrogen in fuel.

As introduced above, the controller 110 may control operation of the engine and other aspects of the power system 108, as well as various other cooperating systems and components. In particular, the controller 110 may selectively command operation of the air intake arrangement 130, the fuel arrangement 150, and the exhaust arrangement 170 to provide desired ignition, combustion, and emissions characteristics within the engine 120 under all appropriate conditions. Generally, the controller 110 (FIG. 1) may be in communication with various aspects of the power system 108 to collect information about operation of the power system 108 and to implement or command modification and/or maintenance of such operation.

As further described in greater detail below, the controller 110 may particularly command the air intake arrangement 130, the fuel arrangement 150, and the exhaust arrangement 170 according to one or more control modes, including a stoichiometric control mode in which a stoichiometric equivalence ratio of air and fuel is injected into the engine 120 and a lean control mode in which an amount of air that is greater than a stoichiometric amount for the corresponding amount of fuel (or provides an amount of fuel that is less than a stoichiometric amount for the corresponding amount of air) is injected into the engine 120. In addition to controlling the air-fuel ratio, the controller 110 may further command aspects of the exhaust arrangement 170 in order to address emissions issues, particularly in the lean control mode.

The power system 108 depicted in FIG. 2 is merely one example of a power system that may utilize a mechanism to enhance efficiency and reliability with respect to ignition and/or combustion, as discussed in greater detail below with reference to FIG. 3. Other configurations of power systems may be provided.

Operation of the power system 108 is discussed with reference to the flowchart of FIG. 3 that depicts an example method 210 of operation that may be implemented by the controller 110 and other aspects of the power system 108 of FIG. 2. In the discussion of FIG. 3 below, reference is additionally made to FIG. 2.

Figure 3:
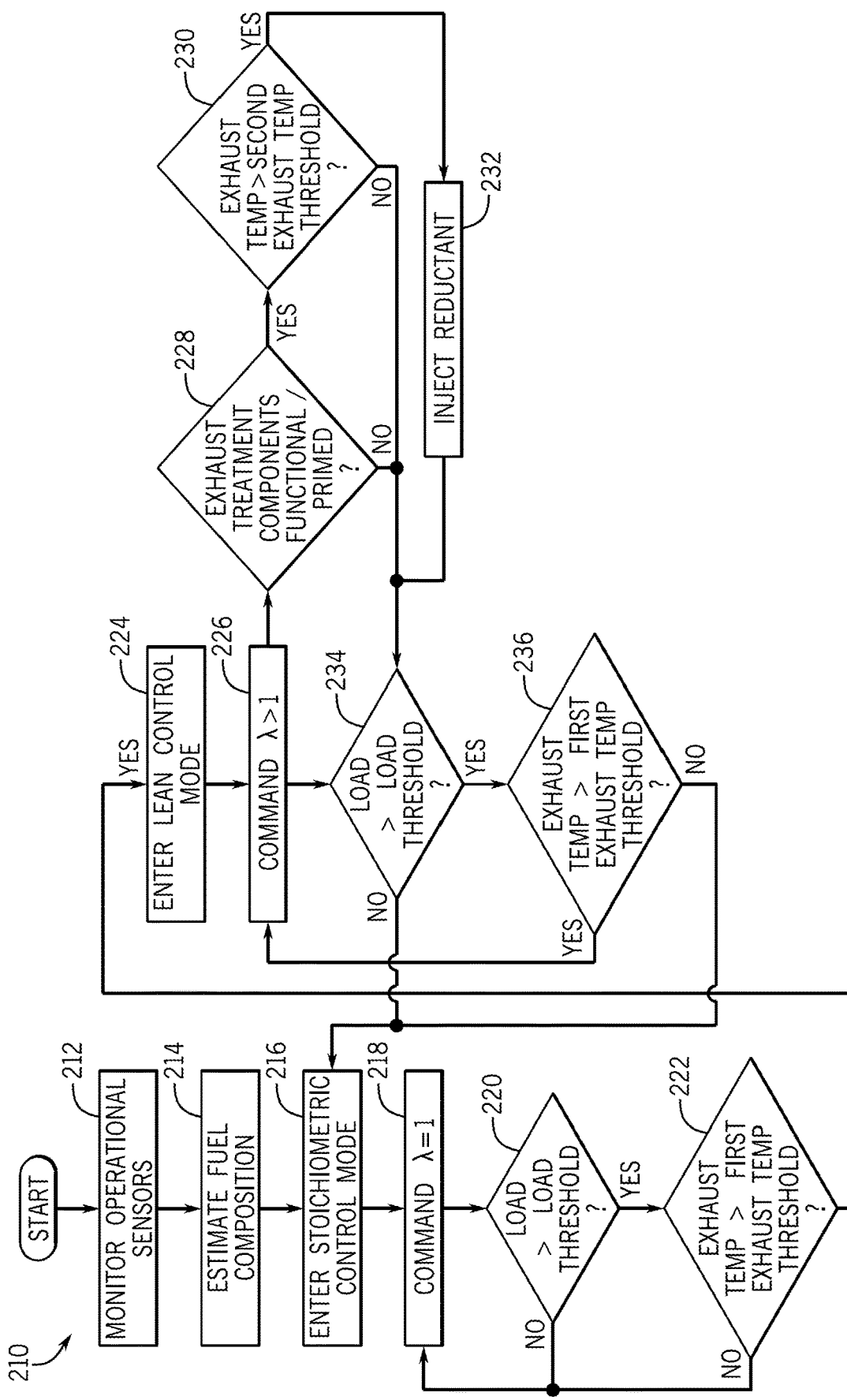
FIG. 3 is a flowchart of a method for operating a power system, such as that shown in FIG. 2, in accordance with an example embodiment.

Referring to the method 210 of FIG. 3, in a first step 212 of operation, the controller 110 receives and monitors sensor data (e.g., from sensors 200a-200i) from the power system 108. Such information may include exhaust temperature, exhaust oxygen, and exhaust nitrogen oxides (NOx) (e.g., from sensors 200e, 200f, 200g), as well as air intake flow rate (e.g., from sensor 200i).

In a further step 214, the controller 110 receives and monitors sensor data about the fuel, particularly the composition of the blended fuel based on information from sensor 200a. In one example, the controller 110 estimates the relative amount of methane ($CH_4$) and hydrogen ($H_2$), as well as any other constituents. Based on this information, the controller 110 may determine the stoichiometric equivalence ratio for the stoichiometric and/or lean control modes, as discussed below.

In a further step 216, the controller 110 continues or places the power system 108 into a stoichiometric (or first) control mode; and further, in step 218, the controller 110 commands the power system 108 to operate according to a stoichiometric equivalence ratio. In particular, based on the fuel composition, the controller 110 may command the air throttle valve 138 and/or fuel arrangement 150 to collectively provide a stoichiometric amount of air and fuel. Generally, operating the methane ($CH_4$) and hydrogen ($H_2$) blend of fuel generates a relatively high exhaust temperature (e.g., above 400° C.) to facilitate methane ($CH_4$) oxidation and warm-up of the exhaust arrangement 170.

In steps 220, 222, the controller 110 generally evaluates the operation of the power system 108 during the stoichiometric control mode in order to determine if modification is warranted. In particular, in step 220, the controller 110 evaluates the load on the power system 108 (e.g., based on information from operator interface 116). If the load exceeds a predetermined load threshold, the method 210 continues to step 222. If the load fails to exceed a predetermined load threshold, the method 210 returns to step 218 and continues operation in the stoichiometric control mode. In one example, the load threshold may be selected as a driver or indicator of the resulting exhaust temperature, e.g., whether or not the exhaust temperature will have a temperature suitable for catalyzing nitrogen oxides (NOx) in the exhaust during a potential lean control mode.

In step 222, the controller 110 evaluates the exhaust temperature (e.g., from sensors 200e, 200f, 200g) relative to a predetermined exhaust temperature threshold. If the exhaust temperature exceeds the predetermined exhaust temperature threshold, the method 210 proceeds to step 224. If the exhaust temperature fails to exceed a predetermined exhaust temperature threshold, the method 210 returns to step 218 and continues operation in the stoichiometric control mode. In one example, the predetermined exhaust temperature threshold is selected as a temperature suitable for catalyzing nitrogen oxides (NOx) in the exhaust during a potential lean control mode.

In step 224, the controller 110 places the power system 108 into a lean (or second) control mode; and further, in step 226, the controller 110 commands the power system 108 to operate according to a lean equivalence ratio. In particular, based on the fuel composition, the controller 110 may command the air throttle valve 138 and/or fuel arrangement 150 to provide an amount of air that is greater than a stoichiometric amount for the corresponding amount of fuel (or provides an amount of fuel that is less than a stoichiometric amount for the corresponding amount of air). After step 226, the method 210 continues to step 234.

During operation of in the lean control mode, the method 210 may additionally include steps 228, 230, 232 in order to address emissions issues. In particular, in step 228, the controller 110 determines if the exhaust treatment components 176, 178, 180 are operating and/or primed. If the exhaust treatment components 176, 178, 180 are not operational or primed, the method 210 continues to step 234. However, if the exhaust treatment components 176, 178, 180 are operational and primed, the method continues to step 230. In step 230, the controller evaluates the exhaust temperature (e.g., based on information from sensors 200e, 200f, 200g) relative to a second (or further) predetermined exhaust temperature threshold. Generally, the second exhaust temperature threshold is set in order to evaluate if the exhaust has a sufficient temperature to activate a catalyst that may improve emissions. In one example, the second exhaust temperature threshold may be the same threshold as the first exhaust temperature threshold referenced in step 222, and in other examples, the first and second exhaust temperature thresholds may be different thresholds.

In step 230, if the exhaust temperature fails to exceed the second exhaust temperature threshold, the method 210 proceeds to step 234. However, in step 230, if the exhaust temperature is at least equal to the second exhaust temperature threshold, the method 210 proceeds to step 232.

In step 232, the controller 110 commands the injection of a reductant into the emissions. For example, the controller 110 may command the reductant injection component 178 to inject the reductant into the flow of exhaust such that ammonia is formed, and subsequently, water ($H_2O$) and nitrogen ($N_2$) in the SCR system 180. As such, any increase in undesirable emissions in the lean control mode that may otherwise be an issue may be mitigated or eliminated by actuation of the exhaust treatment components (e.g., components 176, 178, 180). As such, although the exhaust treatment components 176, 178, 180 may selectively operate (or not) during the stoichiometric control mode, the exhaust treatment components 176, 178, 180 are particularly effective to address emissions during the lean control mode.

Further to step 226, 228, 230, 232, the method 210 continues to monitor the load and exhaust temperature to determine if the lean control mode is appropriate. In particular, in step 234, the controller 110 again evaluates the load on the power system 108. If the load exceeds a predetermined load threshold, the method 210 continues to step 236. If the load fails to exceed a predetermined load threshold, the method 210 returns to step 216 and operates in the stoichiometric control mode. The load threshold in step 234 may be the same or different from the load threshold in step 220.

In step 222, the controller 110 evaluates the exhaust temperature (e.g., from sensors 200e, 200f, 200g) relative to a predetermined exhaust temperature threshold. If the exhaust temperature exceeds the predetermined exhaust temperature threshold, the method 210 proceeds to step 226 to continue operation in the lean control mode. If the exhaust temperature fails to exceed a predetermined exhaust temperature threshold, the method 210 returns to step 216 and operates in the stoichiometric control mode. In one example, the method 210 may continue until operation of the power system 108 is terminated.

Accordingly, the power systems discussed above provide the ability to use a blended fuel of methane ($CH_4$) and hydrogen ($H_2$) in a work vehicle engine over a range of conditions by manipulating the air-fuel ratio based on various characteristics and/or by managing exhaust treatment components. Overall, the power systems described herein result in a platform architecture that may provide improved fuel consumption, higher performance, and reduced criteria pollutants over a relatively wide temperature operating window.

As will be appreciated by one skilled in the art, certain aspects of the disclosed subject matter may be embodied as a method, system (e.g., a work vehicle control or power system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A power system for a work vehicle, comprising:
    an intake arrangement configured to intake charge air;
    a fuel arrangement including a fuel tank configured to store a blend of methane ($CH_4$) and hydrogen ($H_2$) fuel;
    an engine including a plurality of piston-cylinder sets configured to receive, ignite, and combust a mixture of the charge air and the blend of methane ($CH_4$) and hydrogen ($H_2$) fuel; and
    a controller coupled to selectively command one or more of the intake arrangement, the fuel arrangement, and the engine such that,
        in a first mode, the controller commands the one or more of the intake arrangement, the fuel arrangement, and the engine such that the charge air and the blend of methane ($CH_4$) and hydrogen ($H_2$) fuel are introduced into the engine at a stoichiometric equivalence ratio; and
        in a second mode, the controller commands the one or more of the intake arrangement, the fuel arrangement, and the engine such that the charge and the blend of methane ($CH_4$) and hydrogen ($H_2$) fuel are introduced into the engine at a lean equivalence ratio.

2. The power system of claim 1, wherein the controller is configured to selectively command the one or more of the intake arrangement, the fuel arrangement, and the engine into the first mode and into the second mode based at least partially on engine load.

3. The power system of claim 2, wherein the controller is configured to selectively command the one or more of the intake arrangement, the fuel arrangement, and the engine into the first mode when the engine load is less than or equal to a load threshold and into the second mode when the engine load exceeds the load threshold.

4. The power system of claim 1,
    wherein the controller is configured to selectively command the one or more of the intake arrangement, the fuel arrangement, and the engine into the first mode and into the second mode based at least partially on exhaust temperature; and wherein the controller is configured to selectively command the one or more of the intake arrangement, the fuel arrangement, and the engine into the first mode when the exhaust temperature is less than or equal to an exhaust temperature threshold and into the second mode when the exhaust temperature exceeds the exhaust temperature threshold.

5. The power system of claim 1, wherein the controller is configured to selectively command the one or more of the intake arrangement, the fuel arrangement, and the engine into the first mode and into the second mode based at least partially on engine load and exhaust temperature.

6. The power system of claim 5,
wherein the controller is configured to selectively command the one or more of the intake arrangement, the fuel arrangement, and the engine into the first mode when the engine load is less than or equal to a load threshold or when the exhaust temperature is less than or equal to an exhaust temperature threshold; and
wherein the controller is configured to selectively command the one or more of the intake arrangement, the fuel arrangement, and the engine into the second mode when the engine load exceeds the load threshold and the exhaust temperature exceeds the exhaust temperature threshold.

7. The power system of claim 1,
further comprising an exhaust arrangement coupled to the controller and positioned downstream of the engine to receive exhaust;
wherein, in the second mode, the controller is configured to selectively command the exhaust arrangement to inject a reductant into the exhaust; and
wherein, in the second mode, the controller is configured to command the exhaust arrangement to inject a reductant into the exhaust when an exhaust temperature is greater than an exhaust temperature threshold.

8. The power system of claim 1, further comprising an exhaust arrangement coupled to the controller and positioned downstream of the engine to receive exhaust, and wherein the exhaust arrangement includes a three-way catalyst.

9. The power system of claim 1, further comprising an exhaust arrangement coupled to the controller and positioned downstream of the engine to receive exhaust, and wherein the exhaust arrangement includes a particulate filter and a selective catalytic reduction (SCR) system.

10. The power system of claim 1, further comprising a fuel sensor coupled to the controller, and wherein the controller is configured to estimate a composition of the blend of methane ($CH_4$) and hydrogen ($H_2$) fuel in the fuel arrangement and to determine the stoichiometric equivalence ratio and the lean equivalence ratio based on the composition.

11. A work vehicle, comprising:
a chassis;
a drive assembly supported on the chassis; and
a power system supported on the chassis and configured to power the drive assembly, the power system comprising:
an intake arrangement configured to intake charge air;
a fuel arrangement including a fuel tank configured to store a blend of methane ($CH_4$) and hydrogen ($H_2$) fuel;
an engine including a plurality of piston-cylinder sets configured to receive, ignite, and combust a mixture of the charge air and the blend of methane ($CH_4$) and hydrogen ($H_2$) fuel; and
a controller coupled to selectively command one or more of the intake arrangement, the fuel arrangement, and the engine such that,
in a first mode, the controller commands the one or more of the intake arrangement, the fuel arrangement, and the engine such that the charge air and the blend of methane ($CH_4$) and hydrogen ($H_2$) fuel are introduced into the engine at a stoichiometric equivalence ratio; and
in a second mode, the controller commands the one or more of the intake arrangement, the fuel arrangement, and the engine such that the charge and the blend of methane ($CH_4$) and hydrogen ($H_2$) fuel are introduced into the engine at a lean equivalence ratio.

12. The work vehicle of claim 11,
wherein the controller is configured to selectively command the one or more of the intake arrangement, the fuel arrangement, and the engine into the first mode and into the second mode based at least partially on engine load, and
wherein the controller is configured to selectively command the one or more of the intake arrangement, the fuel arrangement, and the engine into the first mode when the engine load is less than or equal to a load threshold and into the second mode when the engine load exceeds the load threshold.

13. The work vehicle of claim 11,
wherein the controller is configured to selectively command the one or more of the intake arrangement, the fuel arrangement, and the engine into the first mode and into the second mode based at least partially on exhaust temperature; and
wherein the controller is configured to selectively command the one or more of the intake arrangement, the fuel arrangement, and the engine into the first mode when the exhaust temperature is less than or equal to an exhaust temperature threshold and into the second mode when the exhaust temperature exceeds the exhaust temperature threshold.

14. The work vehicle of claim 11,
wherein the controller is configured to selectively command the one or more of the intake arrangement, the fuel arrangement, and the engine into the first mode and into the second mode based at least partially on engine load and exhaust temperature;
wherein the controller is configured to selectively command the one or more of the intake arrangement, the fuel arrangement, and the engine into the first mode when the engine load is less than or equal to a load threshold or when the exhaust temperature is less than or equal to an exhaust temperature threshold; and
wherein the controller is configured to selectively command the one or more of the intake arrangement, the fuel arrangement, and the engine into the second mode when the engine load exceeds the load threshold and the exhaust temperature exceeds the exhaust temperature threshold.

15. The work vehicle of claim 11,
further comprising an exhaust arrangement coupled to the controller and positioned downstream of the engine to receive exhaust; and
wherein, in the second mode, the controller is configured to selectively command the exhaust arrangement to inject a reductant into the exhaust when an exhaust temperature is greater than an exhaust temperature threshold.

16. A method of operating a power system for a work vehicle with an intake arrangement configured to intake charge air, a fuel arrangement including a fuel tank configured to store a blend of methane ($CH_4$) and hydrogen ($H_2$) fuel, an engine including a plurality of piston-cylinder sets configured to receive, ignite, and combust a mixture of the charge air and the blend of methane ($CH_4$) and hydrogen ($H_2$) fuel, and a controller coupled to selectively command one or more of the intake arrangement, the fuel arrangement, and the engine, the method comprising:

estimating, with a fuel sensor and the controller, a fuel composition of the blend of methane ($CH_4$) and hydrogen ($H_2$) fuel;

commanding, in a first mode by the controller, the one or more of the intake arrangement, the fuel arrangement, and the engine such that the charge air and the blend of methane ($CH_4$) and hydrogen ($H_2$) fuel are introduced into the engine at a stoichiometric equivalence ratio; and commanding, in a second mode by the controller, the one or more of the intake arrangement, the fuel arrangement, and the engine such that the charge and the blend of methane ($CH_4$) and hydrogen ($H_2$) fuel are introduced into the engine at a lean equivalence ratio.

17. The method of claim 16, wherein the commanding, in the first mode, includes commanding the one or more of the intake arrangement, the fuel arrangement, and the engine into the first mode and into the second mode based at least partially on engine load, and wherein the commanding, in the second mode, includes commanding the one or more of the intake arrangement, the fuel arrangement, and the engine into the first mode when the engine load is less than or equal to a load threshold and into the second mode when the engine load exceeds the load threshold.

18. The method of claim 16, wherein the commanding, in the first mode, includes commanding the one or more of the intake arrangement, the fuel arrangement, and the engine into the first mode and into the second mode based at least partially on exhaust temperature; and wherein the commanding, in the second mode, includes commanding the one or more of the intake arrangement, the fuel arrangement, and the engine into the first mode when the exhaust temperature is less than or equal to an exhaust temperature threshold and into the second mode when the exhaust temperature exceeds the exhaust temperature threshold.

19. The method of claim 16, wherein the commanding, in the first mode, includes commanding the one or more of the intake arrangement, the fuel arrangement, and the engine into the first mode when an engine load is less than or equal to a load threshold or when an exhaust temperature is less than or equal to an exhaust temperature threshold; and wherein the commanding, in the second mode, includes commanding the one or more of the intake arrangement, the fuel arrangement, and the engine into the second mode when the engine load exceeds the load threshold and the exhaust temperature exceeds the exhaust temperature threshold.

20. The method of claim 16, commanding, in the second mode by the controller, an exhaust arrangement to inject a reductant into the exhaust when an exhaust temperature is greater than an exhaust temperature threshold.

* * * * *